(12) United States Patent
Butschbacher

(10) Patent No.: US 7,163,976 B2
(45) Date of Patent: Jan. 16, 2007

(54) ADHESION PROMOTER FOR PLASTISOLS

(75) Inventor: Guenter Butschbacher, Meckesheim (DE)

(73) Assignee: Henkel-Teroson GmbH, Heidelberg (DE)

(*) Notice: Subject to any disclaimer, the term of this patent is extended or adjusted under 35 U.S.C. 154(b) by 398 days.

(21) Appl. No.: 10/736,733

(22) Filed: Dec. 16, 2003

(65) Prior Publication Data

US 2004/0167253 A1   Aug. 26, 2004

Related U.S. Application Data

(63) Continuation of application No. PCT/EP02/06686, filed on Jun. 18, 2002.

(51) Int. Cl.
*C08L 5/00* (2006.01)
*C08L 3/00* (2006.01)
*C08F 6/14* (2006.01)

(52) U.S. Cl. .................. 524/56; 523/210; 523/218; 524/27; 524/58; 524/502

(58) Field of Classification Search .................. 524/56, 524/58, 27, 502; 523/210, 218
See application file for complete search history.

(56) References Cited

U.S. PATENT DOCUMENTS

| | | | |
|---|---|---|---|
| 3,179,646 A | | 4/1965 | Ingraham |
| 4,278,713 A | | 7/1981 | Burba et al. |
| 4,533,524 A | * | 8/1985 | Burba et al. ............. 427/372.2 |
| 4,717,746 A | | 1/1988 | Leoni et al. |
| 5,039,768 A | | 8/1991 | Gerace et al. |
| 5,130,402 A | | 7/1992 | Akiyama et al. |
| 5,492,949 A | | 2/1996 | Drewes et al. |
| 5,519,077 A | | 5/1996 | Drewes et al. |
| 6,111,048 A | * | 8/2000 | Asahina et al. ............... 528/45 |

FOREIGN PATENT DOCUMENTS

| | | |
|---|---|---|
| DE | 26 42 514 A1 | 3/1978 |
| DE | 29 06 134 A1 | 8/1980 |
| DE | 31 11 815 A1 | 2/1982 |
| DE | 32 01 265 A1 | 7/1983 |
| DE | 43 03 984 C1 | 3/1994 |
| EP | 0 209 653 B1 | 8/1986 |
| EP | 0 214 495 B1 | 1/1991 |
| EP | 0 343 101 B1 | 7/1992 |
| EP | 0 533 026 A2 | 3/1993 |
| EP | 0 263 053 B1 | 5/1993 |
| EP | 0 543 501 A1 | 5/1993 |
| EP | 0 559 254 A1 | 9/1993 |
| EP | 0 885 923 A1 | 12/1998 |
| EP | 0 171 850 B2 | 12/2000 |
| GB | 1193896 | 6/1970 |
| GB | 2 073 224 A | 10/1981 |
| JP | 63 063737 | 3/1988 |
| JP | 01101849 | 4/1989 |

OTHER PUBLICATIONS

Patent Abstracts of Japan, vol. 012, No. 297, (C-519), JP 63 063737 (Aug. 1988).
Patent Abstracts of Japan, vol. 013, No. 315 (C619), JP 01 101849 (Apr. 1989).
Paul E. Bruins, Plasticizer Technology, Reinhold Publ. Corp., New York, vol. 1, pp. 228-232.
Salt Spray Testing, DIN 50 021, Beuth Verlag GmbH, Berlin (Jun. 1988).

* cited by examiner

*Primary Examiner*—Ana Woodward
(74) *Attorney, Agent, or Firm*—Stephen D. Harper

(57) ABSTRACT

The addition of pulverulent monosaccharides, disaccharides or oligosaccharides to plastisols based on pulverulent organic polymers and plasticizers results in plastisols with good adhesion properties on a large number of substrates employed in automobile construction. These plastisols are distinguished by good adhesion properties and a high resistance to ageing, and can be employed in automobile construction both in shell construction and in the lacquering line and in the trim shop for adhesive, sealing and coating tasks.

11 Claims, No Drawings

ADHESION PROMOTER FOR PLASTISOLS

This application is a continuation under 35 USC Sections 365(c) and 120 of International Application No. PCT/EP02/06686, filed 18 Jun. 2002 and published 9 Jan. 2003 as WO 03/002645, which claims priority from German Application No. 10130888.4, filed 27 Jun. 2001, each of which is incorporated herein by reference in its entirety.

BACKGROUND OF THE INVENTION

1. Field of the Invention

The invention relates to plastisol compositions based on pulverulent organic polymers and plasticizers and adhesion-promoting additives.

2. Discussion of the Related Art

Plastisols are generally understood as meaning dispersions of organic plastics in plasticizers which gel on heating to a higher temperature and cure on cooling. The plastisols currently usual in practice quite predominantly comprise finely powdered homo- or copolymers of vinyl chloride, which are dispersed in a liquid plasticizer and form a paste. Such polyvinyl chloride plastisols (PVC plastisols) are used for the most diverse purposes. They are employed, inter alia, as sealing compositions, e.g., for seam seals on metal containers or as flange seam adhesives in the metal industry, as corrosion protection coatings for metals (for example as underseals for motor vehicles), for impregnating and coating substrates of textile materials (e.g. as a coating for carpet backing), as cable insulation, etc. Plastisols based on finely powdered methacrylate copolymers (PMMA) or styrene copolymers have also been disclosed. Such plastisols, in particular those based on PVC or PMMA, are also employed to an extensive degree in shell construction in automobile construction, for lining reinforcing structures such as engine bonnets, boot lids, doors and roof constructions, and for gluing flange seals and for sealing seams from other joining processes. Advantageous features in the use of plastisols for these intended applications are their favorable flow properties, in particular at room temperature. To ensure resistance to washers in the various cleaning, phosphating and dip-priming stages in the production of automobile chassis, these plastisol compositions are often initially gelled in a pregelling process to the extent that their viscosity is high enough to ensure this resistance to washers and an initial strength of the components.

Further additives are introduced to the plastisols, depending on the intended use. Such additives are, for example, rheology auxiliaries, stabilizers, adhesion promoters, fillers, pigments, blowing agents, reactive (capable of crosslinking) additives and water-absorbing substances. Adhesion promoters are added to the plastisols in order to effect long-term adhesion of the plastisols on steel, aluminum or galvanized and/or electrodip-coated or otherwise pretreated metal sheets. Basic compounds, such as polyaminoamides (PAA), for example, are used as adhesion promoters for PVC plastisols. Basic vinylimidazoles, which are polymerized in as comonomers, are conventionally used as adhesion promoters for polymethacrylate plastisols. Polyaminoamides are optionally added to these PMMA plastisols as an additional adhesion promoter component. Other adhesion promoter additives for plastisols are also known.

GB-A-1193896 thus describes a PVC plastisol which comprises an epoxy resin and dicyandiamide as well as α-benzyldimethyldiamine as adhesion-promoting substances. DE-A-2642514 proposes the addition of Schiff's bases and/or enamines based on polyaminoamides and epoxy resins to PVC plastisols in order to improve the adhesion thereof to metallic substrates. A large number of patent applications furthermore describes the use of polyaminoamides and derivatives and reaction products thereof as adhesion promoters for plastisols, in particular PVC plastisols, and examples which may be mentioned are DE-A-2906134, DE-A-3111815, DE-A-3201265, EP-A-171850 or EP-A-263053.

The use of blocked diisocyanate polymers, either by themselves or in combination with amine derivatives or polyaminoamide derivatives, as adhesion-promoting substances for plastisols has furthermore been proposed, and there may be mentioned by way of example EP-A-214495 or U.S. Pat. No. 5,130,402.

U.S. Pat. No. 5,039,768 proposes the use of organosilanes, acrylate monomers and unsaturated carboxylic acid monomers and epoxy resins with hardeners as adhesion-promoting additions to PVC plastisols. EP-A-343101 proposes the addition of anhydride compounds and epoxy resins to PVC plastisols, in order thereby to improve the adhesion. In a similar manner, EP-A-533026 proposes copolymers of methyl methacrylate with comonomers containing carboxyl or anhydride groups as adhesion promoters for acrylate plastisols, which can optionally comprise polyaminoamide additives. EP-A-209653 proposes reaction products of epoxy resins and low molecular weight aliphatic polyamines, in particular ethylenediamine, as adhesion-promoting additions to plastisols, in particular to plastisols based on methyl methacrylate copolymers.

In spite of a large number of proposed solutions to achieve good adhesion of plastisol compositions to the most diverse substrates, in particular metallic substrates, it is desirable to achieve, as inexpensively as possible, a permanent and ageing-resistant adhesion of plastisols which can be employed reliably as a flange seam adhesive, lining adhesive or seam seal, as a spot-welding paste or also as a coating composition, optionally with acoustic properties. The products employed in this manner should meet high corrosion protection requirements. The invention is therefore based on the object of providing inexpensive, easily available adhesion-promoting additives for plastisols which meet the current requirements of corrosion protection in automobile construction.

BRIEF SUMMARY OF THE INVENTION

The present invention provides plastisol compositions which are based on pulverulent organic polymers and plasticizers and comprise pulverulent monosaccharides, disaccharides or oligosaccharides.

DETAILED DESCRIPTION OF EMBODIMENTS OF THE INVENTION

Pulverulent organic polymers which can be employed here are, preferably, polyvinyl chloride (PVC), vinyl chloride copolymers with vinyl acetate, styrene and/or alkyl (meth)acrylates, copolymers of styrene with (meth)acrylic acid, (meth)acrylamide and/or alkyl (meth)acrylates or also copolymers of methyl or ethyl methacrylate with C3- to C8-alkyl (meth)acrylates or alkyl (meth)acrylate homopolymers or mixtures of the abovementioned polymers.

Monosaccharides, disaccharides or oligosaccharides which can be employed are glucose, galactose, mannose, fructose, arabinose, xylose, ribose, 2-deoxy-ribose, cellobiose, maltose (malt sugar), lactose (milk sugar), sucrose (cane sugar; particularly preferred because of its particularly good availability and its low price), gentiobiose, melibiose, trehalose, turanose, gentianose, kestose, maltotriose, melecitose, raffinose, stachyose, lychnose, secalose or mixtures thereof.

The mono-, di- or oligosaccharides are preferably employed as finely divided powders, and the average particle size should be between 1 and 100 μm, and should preferably be between 1 and 20 μm. It may be expedient to grind the commercially available saccharides more finely, and conversion thereof into a paste with the plasticizer to be employed in the plastisol is particularly appropriate for this, this paste then being ground with conventional colloid mills or on a roll mill, so that the desired average particle size of the saccharide is achieved.

As a rule, suitable plasticizers are all the conventional plasticizers (in this context compare e.g. Paul E. Bruins, Plasticizer Technology [Reinhold Publ. Corp., New York], vol. 1, p. 228–232). $C_4$- to $C_{16}$-alkyl phthalates, such as dibutyl phthalate, dioctyl phthalate, diheptyl phthalate, benzyl butyl phthalate, dibenzyl phthalate, diisononyl phthalate (DINP), diisodecyl phthalate (DIDP) and diundecyl phthalate (DIUP) are preferred. However, the known plasticizers from the group consisting of organic phosphates, adipates and sebacates or also benzyl benzoate and other benzoate plasticizers, alkylsulfonic acid esters of phenol or cresol, dibenzyltoluene or di-phenyl ether are also suitable. The choice criteria for the plasticizers preferably used depend on the one hand on the polymer composition and on the other hand on the viscosity, the gelling conditions of the plastisol and the desired acoustic properties of a plastisol-coated composite.

The plastisols according to the invention can comprise further reactive additives, such as, for example, di- or polyisocyanates, these preferably being blocked or microencapsulated, and di- or polyamines or polyaminoamides based on polyamines and dimerized or polymerized fatty acids and/or hydroxy-functional compounds, such as, e.g., polyester polyols or polyether polyols. Further examples of reactive additives are combinations of di- or polyepoxy compounds in combination with di- or polyamines or polyaminoamides. The addition of monomeric mono-, di- and/or trimethacrylates or-acrylates or polyester resins, which optionally contain olefinically unsaturated double bonds, in combination with peroxides is possible, although the use of (meth)acrylate monomers is not one of the preferred embodiments of the plastisol compositions according to the invention, since the addition of monomeric (meth)acrylates in combination with peroxides often leads to storage stability problems, and furthermore the flexibility of such compositions at low temperatures is frequently unsatisfactory because of the high degree of crosslinking. Carboxylic acid derivatives, in particular dicarboxylic acids or di- or tricarboxylic acid anhydrides, can furthermore be added to the plastisols according to the invention as reactive additives. Specific examples are adipic acid, pimelic acid, suberic acid, azelaic acid, sebacic acid, undecanedioic acid, dodecandioic acid, phthalic acid, maleic anhydride, succinic anhydride, 1,2,3-propanetricarboxylic anhydride, phthalic anhydride, anhydrides of isomeric benzenetricarboxylic acids, pyromellitic anhydride, methyl-hexahydrophthalic anhydride and similar customary carboxylic acids and anhydrides thereof. β-Dicarbonyl compounds, such as e.g., acetylacetone, acetoacetic ester, dialkyl malonates, benzoylacetic ester or corresponding metal chelates, such as, e.g., zinc acetylacetonate, can furthermore be added.

The reactive additives are conventionally used in amounts of between 0.01 and 4 wt. %, preferably between 0.1 and 20 wt. %, based on the total plastisol formulation.

The plastisols according to the invention can moreover optionally comprise further auxiliary substances and additives such as are conventional in plastisol technology. These include e.g. colored pigments, anti-ageing agents, rheology auxiliaries and blowing agents for the preparation of foamed plastisols.

These conventional additives include, for example, epoxide plasticizers, preferably epoxidized natural oils, such as epoxidized soya bean oil, epoxidized linseed oil or epoxidized tall oils. As is known, these epoxidized plasticizers are used in small amounts as heat stabilizers in PVC plastisols in particular. The plastisols can furthermore comprise the conventional anti-ageing agents and stabilizers, rheology auxiliaries, such as e.g. pyrogenic silicas, bentones and castor oil derivatives.

All the fillers which are customary and known per se in plastisol technology can be used as a filler. Examples of suitable fillers are limestone flour, natural, ground chalks (calcium carbonates or calcium magnesium carbonates), precipitated chalks, barite, talc, mica, clays and pigments, such as, e.g., titanium dioxide, carbon black and iron oxides.

Because of the positive properties and the low price, the pulverulent saccharides can be employed in very high contents in the plastisols according to the invention and thus replace a portion of the fillers. The saccharides can therefore make up as much as 50 wt. % of the total formulation. Many formulations comprise between 3 and 10 or 20 wt. % saccharide. So-called "lightweight fillers" of organic or inorganic composition can furthermore also be employed, and these include, for example, hollow glass beads, fly ash (such as the fillers sold by Trelleborg Fillite Ltd. under the "Fillite" trademark) and organic hollow microbeads based on epoxy resins or phenolic resins. Conductivity-imparting pigments, such as special conductivity carbon blacks, graphite or antimony-doped silicates, can moreover be added. This is necessary in particular if the plastisols are applied in shell construction and electrophoretically deposited lacquer layers are to be applied subsequently to these plastisol layers.

So-called hollow microbeads, or blowing agents in expanded and non-expanded form can moreover be added for the preparation of plastisols of low specific gravity if the plastisols are to be foamed during the gelling process. Suitable blowing agents are all the blowing agents known per se, preferably organic blowing agents from the class of azo compounds, N-nitroso compounds, sulfonylhydrazides or sulfonylsemicarbazides. From the class of azo compounds there may be mentioned by way of example azobisisobutyronitrile and, in particular, azodicarboxamide, from the class of nitroso compounds there may be mentioned by way of example di-nitrosopentamethylenetetramine, from the class of sulfohydrazides there may be mention 4,4'-oxybis(benzensulfonic acid hydrazide) and from the class of semicarbazides there may be mentioned p-toluenesulfonyl semicarbazide.

Another possibility of foaming the plastisols according to the invention comprises addition of so-called hollow microbeads ("microspheres") to the plastisols. Such hollow microbeads either can be added to the plastisol directly in the prefoamed form as hollow microbeads, or in a particularly preferably manner the "hollow microbeads" are added to the plastisol as a finely divided powder in the non-foamed form. These non-foamed "hollow microbeads" do not expand until the gelling process and thus result in a very uniform and fine-pored foaming. The hollow microbeads comprise a liquid blowing agent based on aliphatic hydrocarbons or fluorohydrocarbons as the core and a shell of a copolymer of acrylonitrile with vinylidene chloride and/or methyl methacrylate and/or methacrylonitrile. If such microspheres are employed, expansion of the microspheres and therefore foaming take place only during the gelling process of the plastisol. The use of such microspheres is described, for example, in EP-A-559254. Such "hollow microbeads" are commercially obtainable e.g. under the trade name "Expancel" from Nobel Industries or under the trade name "Dualite" from Pierce & Stevens.

According to the invention it is moreover possible to further improve properties of the plastigel, in particular the abrasion resistance, by adding to the plastisol, in an amount of up to 40 wt. %, a compound which reacts at the gelling temperature, with crosslinking, with the carboxyl groups of the copolymer optionally present. Long-chain epoxy compounds, epoxidized polybutadienes or also epoxidized natural oils, such as epoxidized soya bean oil or solid, pulverulent epoxide derivatives are possible in particular for a reaction with the carboxyl groups present. Liquid hydroxy-functional polybutadienes or mercaptan-terminated liquid polymers can furthermore be used instead of or in combination with polypropylene glycols. The formation of ester bonds between these compounds and the carboxyl groups of the copolymer in general already takes place on heating of the plastisol to the gelling temperature. However, suitable catalysts can optionally be added in an amount of about 0.01 to 2.0 wt. %, e.g. imidazole or substituted imidazoles, such as N-alkylimidazoles, e.g. N-methylimidazole, tertiary amines, tetramethylenediamine or urea derivatives, optionally precipitated on inert fillers. Alkylbenzenesulfonic acids and titanates are also suitable as catalysts for ester formation with glycols.

Amino- and/or amido-functional compounds and/or blocked polyurethanes, individually or in combination, such as are known as adhesion promoters from PVC plastisol technology, can furthermore be added to the plastisols according to the invention, these having the effect of a considerable improvement in the abrasion resistance. Examples of such compounds are the well-known polyaminoamides based on dimerized fatty acids and low molecular weight di- or polyamines, such as are known e.g. under the trade name Versamid 115, 125 or 140, and/or amino-functional condensation products of epoxides based on the bisglycidyl ether of bisphenol A with diamines or polyamines, such as, e.g., ethylenediamine, propylenediamine, etc.

Another possibility for improving the mechanical properties of the plastigels comprises dissolving polyurethane-forming agents in the form of isocyanate prepolymers and low molecular weight aliphatic or cycloaliphatic diamines in the plasticizer. The isocyanate prepolymers here preferably contain blocked isocyanate groups, e.g., isocyanate groups blocked by caprolactam, or they are present in the form of solid, microehcapsulated or surface-deactivated isocyanate compounds as a dispersion in the liquid phase. These isocyanate derivatives can be present in an amount of up to 30 wt. % of the total formulation, and the (cyclo)aliphatic diamines can make up as much as 5 wt. % of the total formulation in the case of low molecular weight amines (up to a molecular weight of about 500) and as much as 30 wt. % in the case of higher molecular weight diamines. On heating to the gelling temperature, polyurethane formation starts, an IPN structure (interpenetrating polymer network) possibly being formed with the plastisol polymer.

If another comonomer having a crosslinking action has been polymerized into the copolymer, the plastisols according to the invention can also comprise further reactive additives for improving the mechanical properties. These depend on the comonomer having a crosslinking action employed. In the case of hydroxy-functional comonomers, di- or polyisocyanate can be added, the latter preferably being blocked or microencapsulated, in the case of epoxy-functional comonomers, di- or polyamines or polyaminoamides are preferably added, and in the case of (blocked) isocyanate-functional comonomers, amino- and/or hydroxy-functional additives can be used. These crosslinking reactions can optionally be accelerated by catalysts which are known per se.

In certain embodiments of the invention, the plastisol compositions may comprise:

a) 5 to 60 wt. % of at least one pulverulent polymer;
b) 5 to 65 wt. % of one or more plasticizers;
c) 0 to 40 wt. % of one or more fillers;
d) 1 to 30 wt. % of at least one mono-, di- or oligoaccharide;
e) 2 to 40 wt. % of one or more reactive additives selected from the group consisting of optionally blocked or microencapsulated di- or polyisocyanates; amino- and/or hydroxy-functional additives, in particular di- or polyamines or polyaminoamides, imidazole derivatives, epoxy resins, condensation products of epoxy resins and polyaminoamides and/or di- or polyamines, dicarboxylic acids, di- or tricarboxylic anhydrides, acetylacetonates, peroxides or mixtures of the abovementioned reactive additive;,
f) optionally, further auxiliary substances and additives; the sum total of the individual components being 100 wt. %.

If saccharides are employed as the adhesion-promoting additive, one or more of the following advantages can be obtained compared with the known prior art:

improved resistance to ageing, in particular in accordance with the salt spray test according to DIN 50021, the VDA test (VDA 621-415), the splashed water test or combinations of these tests, reduced tendency towards blistering after uptake of moisture, use of renewable raw materials low material costs free from toxic heavy metals, therefore toxicologically acceptable and environment-friendly.

In the case of the methacrylate plastisols in particular, the addition of graphite can be omitted, if desired, and ageing-resistant formulations are nevertheless achieved, which was hitherto possible only with addition of graphite.

The plastisol compositions according to the invention have good adhesion properties on the most diverse substrates, such as steel, electrolytically galvanized steel, hot-dip galvanized steel or organically coated steel (e.g., steel having a coating of a material such as those sold under the trade name "Granocoat" or "Bonazink"). According to the prior art to date, an ageing-resistant adhesion and good corrosion protection were possible only by addition of corrosion protection pigments and/or corrosion inhibitors—which often comprise heavy metals.

The plastisols according to the invention are suitable as adhesives, in particular as so-called shell construction adhesives, but also for undersealing, for seam sealing, for lining engine bonnets, boot lids or doors or, if pregelling is employed, also as roof arches. The plastisols according to the invention are furthermore suitable for seam sealing, as a flange seam adhesive, for flange seam sealing or as a spot-welding paste. Because of the good adhesion properties on a large number of substrates, the plastisols according to the invention can thus be employed both in shell construction and in the lacquer sector or in the trim sector in the production of automobiles. Under-floor application to crude metal sheets is also possible.

The following examples are intended to serve for further explanation of the invention, and are by way of example only and do not cover the entire range of plastisols according to the invention. However, the expert can easily deduce the entire range of use from the above information.

EXAMPLES

Example 1: (Comparison)

Flange seam adhesive and flange seam sealing based on a PVC plastisol:

In the following case, corrosion protection pigment or powdered sugar according to the invention was employed in a basic batch according to the prior art (the amount of each component being expressed as a weight % based on the total weight of the batch):

| | |
|---|---|
| Ground polyester resin (synthetic resin LTH) | 4.000% |
| E-PVC type 1 (Vinnolit P 70 PS) | 7.500% |
| E-PVC type 2 (Solvin 374 MB) | 7.500% |
| S-PVC type 3 (Solvin 266 SF) | 15.000% |
| Epoxy resin powder lacquer | 2.000% |
| Diheptyl phthalate | 31.200% |
| Cumene hydroperoxide | 0.300% |
| Dicyandiamide | 0.300% |
| Zinc acetylacetonate | 0.300% |
| Titanium dioxide | 2.000% |
| Calcium oxide | 8.000% |
| Precipitated and coated chalk | 11.000% |
| Highly disperse silicon dioxide | 1.000% |
| Corrosion protection pigment mod. strontium aluminium phosphate | 10.000% |
| Test result: stoving cycle: 15 min at 160 degrees C. + 25 min at 175 degrees C. | |
| Adhesion to sheet steel: stoving cycle: 15 min at 160 degrees C. + 25 min at 175 degrees C. | cohesive fracture |
| Adhesion to electrolytically galvanized steel | cohesive fracture |
| Adhesion to hot-dip galvanized steel | cohesive fracture |
| Test result: stoving cycle 15 min at 160 degrees C. + 25 min at 175 degrees C. and 500 hours salt spray test | |
| Adhesion to sheet steel: stoving cycle: 15 min at 160 degrees C. + 25 min at 175 degrees C. | 60% cohesive fracture |
| Adhesion to electrolytically galvanized steel | 70% cohesive fracture |
| Adhesion to hot-dip galvanized steel | 90% cohesive fracture |
| Blistering after 60 sec at 200 degrees C. + 3 days at 40 degrees C. and 80% rh + 25 min at 175 degrees C. | |
| Layer thickness 0.5 mm | no blisters |
| Layer thickness 1.0 mm | many blisters |
| Layer thickness 2.0 mm | many blisters |
| Layer thickness 3.0 mm | no blisters |
| Example 2: (according to the invention) | |
| Ground polyester resin (synthetic resin LTH) | 4.000% |
| E-PVC type 1 (Vinnolit P 70 PS) | 7.500% |
| E-PVC type 2 (Solvin 374 MB) | 7.500% |
| S-PVC type 3 (Solvin 266 SF) | 15.000% |
| Ground epoxy resin | 2.000% |
| Diheptyl phthalate | 31.200% |
| Cumene hydroperoxide | 0.300% |

| | |
|---|---|
| Dicyandiamide | 0.300% |
| Zinc acetylacetonate | 0.300% |
| Titanium dioxide | 2.000% |
| Calcium oxide | 8.000% |
| Precipitated and coated chalk | 11.000% |
| Highly disperse silicon dioxide | 1.000% |
| Sucrose in the form of powdered sugar | 10.000% |
| Test result: stoving cycle: 15 min at 160 degrees C. + 25 min at 175 degrees C. | |
| Adhesion to sheet steel: stoving cycle: 15 min at 160 degrees C. + 25 min at 175 degrees C. | cohesive fracture |
| Adhesion to electrolytically galvanized steel | cohesive fracture |
| Adhesion to hot-dip galvanized steel | cohesive fracture |
| Test result: stoving cycle 15 min at 160 degrees C. + 25 min at 175 degrees C. and 500 hours salt spray test | |
| Adhesion to sheet steel: stoving cycle: 15 min at 160 degrees C. + 25 min at 175 degrees C. | 60% cohesive fracture |
| Adhesion to electrolytically galvanized steel | 90% cohesive fracture |
| Adhesion to hot-dip galvanized steel | 90% cohesive fracture |
| Blistering after 60 sec at 200 degrees C. + 3 days at 40 degrees C. and 80% rh + 25 min at 175 degrees C. | |
| Layer thickness 0.5 mm | no blisters |
| Layer thickness 1.0 mm | no blisters |
| Layer thickness 2.0 mm | no blisters |
| Layer thickness 3.0 mm | no blisters |

Example 3: (according to the invention)
Commercially available underseal, to which 10% cane sugar was admixed.

| | |
|---|---|
| E-PVC type 1 (Vestolit P 1353 K) | 13.000% |
| Copolymer (PVC/PVAC) (Vinnolit C 14/60 V) | 10.000% |
| Copolymer (PVC/PVAC) (Lacovyl PA 1384) | 2.000% |
| E-PVC type 2 (Vestolit E 7031) | 13.000% |
| Diisononyl phthalate (Palatinol N) | 36.400% |
| Hydrocarbon (Shellsol D 70) | 4.600% |
| Calcium oxide (Schafer; Super 40) | 3.500% |
| Zinc oxide (zinc white resin seal) | 0.400% |
| Pigment (carbon black paste Tack DINP 25/V) | 0.200% |
| PVC hollow beads (Dualite M 6001 AE) | 1.100% |
| Formulated polyaminoamide (Euretek 507) | 1.600% |
| Calcium carbonate, crystalline (Hydrocarb OG) | 2.500% |
| Precipitated calcium carbonate coated with stearin (Winnofil SPT) | 2.000% |
| Highly disperse silica (Aerosil 200) | 0.400% |
| Magnesium oxide (extra-light) | 1.000% |
| Sucrose | 10.000% |
| Test result: | |
| Adhesion after 20 min at 130 degrees C. to KTL | cohesive fracture |

Example 4: (comparison)
Commercially available underseal.

| | |
|---|---|
| E-PVC type 1 (Vestolit P 1353 K) | 13.000% |
| Copolymer (PVC/PVAC) (Vinnolit C 14/60 V) | 10.000% |
| Copolymer (PVC/PVAC) (Lacovyl PA 1384) | 2.000% |
| E-PVC type 2 (Vestolit E 7031) | 13.000% |
| Diisononyl phthalate (Palatinol N) | 36.400% |
| Hydrocarbon (Shellsol D 70) | 4.600% |
| Calcium oxide (Schafer; Super 40) | 3.500% |
| Zinc oxide (zinc white resin seal) | 0.400% |
| Pigment (carbon black paste Tack DINP 25/V) | 0.200% |
| PVC hollow beads (Dualite M 6001 AE) | 1.100% |

| -continued | |
|---|---|
| Formulated polyaminoamide (Euretek 507) | 1.600% |
| Calcium carbonate, crystalline (Hydrocarb OG) | 2.500% |
| Precipitated calcium carbonate coated with stearin (Winnofil SPT) | 12.000% |
| Highly disperse silica (Aerosil 200) | 0.400% |
| Magnesium oxide (extra-light) | 1.000% |
| Test result: | |
| Adhesion after 20 min at 130 degrees C. to KTL | cohesive fracture |

Example 5: (according to the invention) Underseal based on PMMA

| | |
|---|---|
| PMMA copolymer (63% PMMA + 35% PBMA + 2% vinylimidazole) (ground Plex 4893) | 43.000% |
| Diisononyl phthalate (Jayflex DINP) | 43.000% |
| 4,4'-METHYLENE-BIS-2-METHYLCYCLOHEXANAMINE (Laromin C 260) | 0.050% |
| EXTREMELY FINE CALCIUM OXIDE (Schafer; Super 40) | 2.000% |
| Dextrose | 7.295% |
| CARBON BLACK PASTE, DISP. IN DINP | 0.005% |
| METHYL-HEXAHYDROPHTHALIC ANHYDRIDE | 0.060% |
| FATTY ALCOHOL ESTER, DISSOLVED IN DOP (Disperplast-1136) | 0.150% |
| PURE PRECIPITATED ZINC STEARATE (Liga zinc stearate 101) | 0.900% |
| Hollow beads, not expanded (Expancel 095DUX 120) | 3.000% |
| Test result: | |
| Abrasion resistance (TOYOTA method) | 72 kg |
| Adhesion 25 min at 130 degrees C. | cohesive fracture |
| Expansion 25 min at 140 degrees C. | 43% |
| Shore A hardness after 25 min at 140 degrees C. | 28 |

Example 6: Underseal based on PMMA without dextrose

| | |
|---|---|
| PMMA copolymer (63% PMMA + 35% PBMA + 2% vinylimidazole) (ground Plex 4893) | 43.000% |
| Diisononyl phthalate (Jayflex DINP) | 43.000% |
| 4,4'-METHYLENE-BIS-2-METHYLCYCLOHEXANAMINE (Laromin C 260) | 0.050% |
| EXTREMELY FINE CALCIUM OXIDE (Schafer; Super 40) | 2.000% |
| SURFACE-TREATED CHALK (HYDROPHOBIC) (Omya BLP/3) | 7.295% |
| CARBON BLACK PASTE, DISP. IN DINP | 0.005% |
| METHYL-HEXAHYDROPHTHALIC ANHYDRIDE | 0.060% |
| FATTY ALCOHOL ESTER, DISSOLVED IN DOP (Disperplast-1136) | 0.150% |
| PURE PRECIPITATED ZINC STEARATE (Liga zinc stearate 101) | 0.900% |
| Hollow beads, not expanded (Expancel 095DUX 120) | 3.000% |
| Test result: | |
| Abrasion resistance (TOYOTA method) | 66 kg |
| Adhesion 25 min at 130 degrees C. | cohesive fracture |
| Expansion 25 min at 140 degrees C. | 42% |
| Shore A hardness after 25 min at 140 degrees C. | 31 |

Compared with comparison example 1, example 2 according to the invention shows, in all layer thicknesses of the coating, good results after brief gelling at high temperatures followed by storage in moisture. In no case was blistering observed in the coating, while blistering was often observed with the adhesive according to the prior art. The strontium-containing corrosion protection pigment can furthermore be omitted in the example according to the invention.

Example 3 according to the invention shows an underseal which comprises sucrose in large amounts, partly as a filler, so that the content of calcium carbonate of high specific gravity could be drastically reduced. As a result, an underseal of lower specific gravity becomes possible, which is absolutely equivalent in its adhesion properties to a commercially available underseal of higher specific gravity with a high content of calcium carbonate (example 4).

In the same way, the underseal according to the invention based on PMMA, of example 5, results in an underseal of particularly low specific gravity, since the addition of calcium carbonate as a filler could likewise be omitted. The abrasion resistance of the underseal according to the invention according to example 5 is even better than that of comparison example 6 according to the prior art.

The above examples show particularly clearly that the use of sucrose in plastisol adhesives or sealing compositions and underseal compositions allows formulation of plastisols with very good use properties.

What is claimed is:

1. A plastisol composition comprising 5 to 60 weight % of at least one pulverulent organic polymer, 5 to 65 weight % of at least one plasticizer, 1 to 30 weight % of at least one pulverulent saccharide different from said at least one pulverulent organic polymer selected from the group consisting of monosaccharides, disaccharides and oligosaccharides, and 0.01 to 40 weight % of at least one reactive additive different from said at least one pulverulent saccharide and said at least one pulverulent organic polymer selected from the group consisting of polyisocyanates, blocked polyisocyanates, microencapsulated polyisocyanates, amino-functional additives other than condensation products of epoxy resins and polyaminoamides and/or polyamines, hydroxy-functional additives other than said at least one pulverulent saccharide, epoxy resins, condensation products of epoxy resins and polyaminoamides and/or polyamines, dicarboxylic acids, di- and tricarboxylic acid anhydrides, β-dicarbonyl compounds other than said dicarboxylic acids and di- and tricarboxylic acid anhydrides, metal chelates of β-dicarbonyl compounds, peroxides and mixtures thereof, wherein the weight % of each individual component is based on the sum total of said individual components.

2. A plastisol composition according to claim 1, wherein the at least one pulverulent organic polymer is selected from the group consisting of polyvinyl chloride, copolymers of vinyl chloride with vinyl acetate, styrene and/or alkyl (meth)acrylates, copolymers of styrene with (meth)acrylic acid, (meth)acrylamide and/or alkyl (meth)acrylates, copolymers of methyl or ethyl (meth)acrylate with $C_3$- to $C_8$-alkyl (meth)acrylates, alkyl (meth)acrylate homopolymers and mixtures thereof.

3. A plastisol composition according to claim 1, wherein the at least one pulverulent saccharide is selected from the group consisting of dextrose, glucose, galactose, mannose, fructose, arabinose, xylose, ribose, 2-deoxy-ribose, cellobiose, maltose (malt sugar), lactose (milk sugar), sucrose (cane sugar), gentiobiose, melibiose, trehalose, turanose, gentianose, kestose, maltotriose, melecitose, raffinose, stachyose, lychnose, secalose and mixtures thereof.

4. A plastisol composition according to claim 1, wherein the at least one pulverulent saccharide has an average particle size of 1 to 100 μm.

5. A plastisol composition according to claim 1, additionally comprising up to 40 weight % of at least one filler.

6. A plastisol composition according to claim 1, wherein the at least one pulverulent saccharide has an average particle size of 1 to 20 μm.

7. A plastisol composition according to claim 1 comprising 3 to 10 weight % of at least one pulverulent saccharide.

8. A plastisol composition according to claim 1, wherein said at least one pulverulent saccharide is selected from the group consisting of dextrose, sucrose, and mixtures thereof.

9. A plastisol composition according to claim 1, additionally comprising at least one additive selected from the group consisting of pigments, anti-aging agents, rheology auxiliaries, blowing agents and mixtures thereof.

10. A plastisol composition according to claim 1, wherein said at least one plasticizer is selected from the group consisting of $C_4$- to $C_{16}$-alkyl phthalates.

11. A plastisol composition according to claim 1, additionally comprising hollow microbeads containing liquid blowing agent.

* * * * *

UNITED STATES PATENT AND TRADEMARK OFFICE
CERTIFICATE OF CORRECTION

PATENT NO. : 7,163,976 B2 Page 1 of 1
APPLICATION NO. : 10/736733
DATED : January 16, 2007
INVENTOR(S) : Butschbacher It is certified that error appears in the above-identified patent and that said Letters Patent is hereby corrected as shown below:

Title page, insert --(30) Foreign Application Priority Data, Jun. 27, 2001 (DE) 101 30 888--.

Signed and Sealed this

Twenty-second Day of May, 2007

JON W. DUDAS
*Director of the United States Patent and Trademark Office*